(12) United States Patent
Zeng et al.

(10) Patent No.: US 12,186,909 B2
(45) Date of Patent: Jan. 7, 2025

(54) ROBOT CONTROL METHOD, ROBOT, AND COMPUTER-READABLE STORAGE MEDIUM

(71) Applicant: UBTECH ROBOTICS CORP LTD, Shenzhen (CN)

(72) Inventors: Xianwen Zeng, Shenzhen (CN); Yizhang Liu, Shenzhen (CN); Xuan Luo, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 293 days.

(21) Appl. No.: 18/075,450

(22) Filed: Dec. 6, 2022

(65) Prior Publication Data

US 2024/0181633 A1 Jun. 6, 2024

(51) Int. Cl.
*B25J 9/16* (2006.01)

(52) U.S. Cl.
CPC .......... *B25J 9/1633* (2013.01); *B25J 9/1612* (2013.01); *B25J 9/1653* (2013.01); *B25J 9/1664* (2013.01); *B25J 9/1607* (2013.01); *G05B 2219/39339* (2013.01)

(58) Field of Classification Search
CPC ...... B25J 9/1633; B25J 9/1612; B25J 9/1653; B25J 9/1664; B25J 9/1607; G05B 2219/39339
See application file for complete search history.

(56) References Cited

U.S. PATENT DOCUMENTS

| 2007/0120512 A1* | 5/2007 | Albu-Schaffer | ....... B25J 9/1643 |
| | | | 318/568.2 |
| 2021/0001490 A1* | 1/2021 | Yamane | ................. B25J 9/1676 |
| 2021/0362334 A1* | 11/2021 | Yamane | ............. G05B 19/4155 |

FOREIGN PATENT DOCUMENTS

| CN | 113070881 A | * | 7/2021 | .............. B25J 13/00 |
| CN | 114700951 A | * | 7/2022 | |

OTHER PUBLICATIONS

Benzi, F., et al., "An Optimization Approach for a Robust and Flexible Control in Collaborative Applications", Mar. 2021, arXiv (Year: 2021).*

* cited by examiner

*Primary Examiner* — Bhavesh V Amin
*Assistant Examiner* — Karston G. Evans

(57) ABSTRACT

A robot control method, a robot, and a computer-readable storage medium are provided. The method includes: obtaining a trajectory planning parameter of joint(s) of the robot, force data of an end of the robot, and force data of the joint(s); obtaining an end admittance compensation amount; determining a first joint parameter and a first slack variable corresponding to the end admittance compensation amount in a joint space of each of the joint(s) based on the end admittance compensation amount and the trajectory planning parameter; obtaining a joint admittance compensation amount; determining a second joint parameter based on the first joint parameter, the first slack variable, the joint admittance compensation amount, and the trajectory planning parameter; determining a target joint commanding position based on the second joint parameter; and controlling the robot to move according to the target joint commanding position.

20 Claims, 4 Drawing Sheets

ROBOT CONTROL METHOD, ROBOT, AND COMPUTER-READABLE STORAGE MEDIUM

BACKGROUND

1. Technical Field

The present disclosure relates to robot technology, and particularly to a robot control method, a robot, and a computer-readable storage medium.

2. Description of Related Art

With the development of robotics, robots are widely used in various application scenarios such as industrial manufacturing, medical care, and commercial services. In the scenarios, there are situations that require a robot to come into close contact with other objects or people, for example, cleaning tables, cleaning shoes, or shaking hands with people. In these cases, if the ordinary position control method that repulses external force is used, due to the high demand for positioning accuracy and the high rigidity of the robot, once the position deviates, an excessive contact force will be generated between the robot and the operation object, which will cause damage to the operation object and the robot itself.

In order to avoid damage to the operation object or the robot caused by the position deviations, the compliance control for the robot is required. Compared with the ordinary position control method, the compliance control method is capable of controlling the robot to move in accordance with an external force when it is subjected to the external force, and restoring to the previous state after the external force is withdrawn. That is, the compliance control is a control method that avoids rigid collisions between the robot and the operation object by controlling the robot to perform inertial motion in accordance with the external force. Although the existing compliance control methods can reduce the collision between the robot and the operation object to a certain extent, they still have defects to a certain extent.

BRIEF DESCRIPTION OF THE DRAWINGS

To describe the technical schemes in this embodiment or in the prior art more clearly, the following briefly introduces the drawings required for describing the embodiments or the prior art.

DETAILED DESCRIPTION

Figure 1:
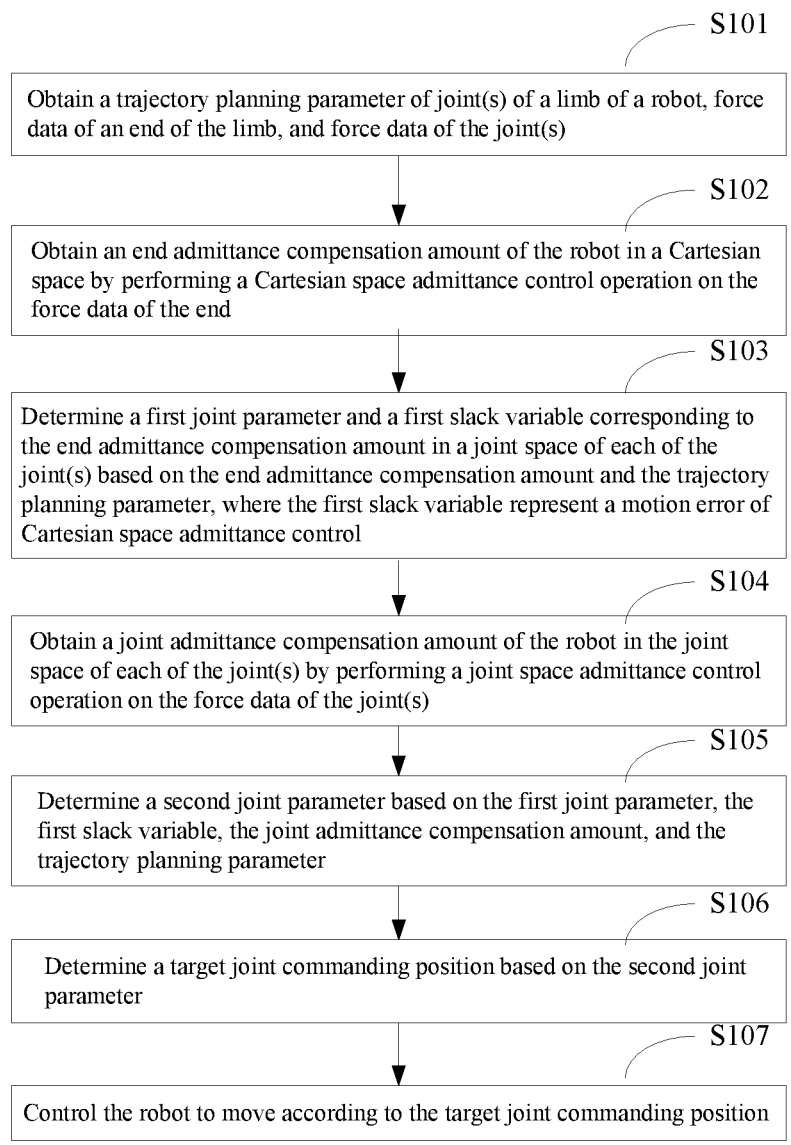
FIG. 1 is a flow chart of a robot control method according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

In the present disclosure, the terms "first", "second", "third", and the like in the descriptions are only used for distinguishing, and cannot be understood as indicating or implying relative importance.

In various application scenarios of robots, there are scenarios that require robots to be in close contact with other objects or people, for example, cleaning tables, cleaning shoes, or shaking hands with people. In these scenarios, the robot is required to have a certain compliant control ability to avoid excessive contact force caused by positional errors which will damage the operation object/robot. At present, there are methods to realize the compliance control of a robot through the admittance control in Cartesian space or that in joint space. However, the robot compliance control method usually randomly selects one of the admittance control in Cartesian space and that in joint space, or in some cases, the two admittance controls will be implemented independently but the two admittance controls cannot be effectively combined, which results in that the joint admittance control may affect the accurate task position of the robot in Cartesian space. There, the existing robot compliance control method have defects to a certain extent.

In order to solve the above-mentioned technical problems, the embodiments of the present disclosure provide a robot control method, a robot, and a computer-readable storage medium. The method includes: after obtaining a trajectory planning parameter of a limb of a robot, force data of an end of the limb of the robot, and force data of joints of the limb of the robot, it may determine an end admittance compensation amount of the robot in a Cartesian space first by performing a Cartesian space admittance control operation based on the force data of the end, calculate a first joint parameter and a first slack variable that the end admittance compensation amount maps onto a joint space, and determine a joint admittance compensation amount of the robot in the joint space by performing a joint space admittance control operation based on the force data of the joints, and then determine a second joint parameter in the joint space based on the first joint parameter and the first slack variable that are calculated based on the end admittance compensation amount as well as the joint admittance compensation amount and the trajectory planning parameter, and further determine a target joint commanding position based on the second joint parameter so as to control the robot to move.

The first joint parameter is capable of realizing the compliance control of the robot in the Cartesian space because the first joint parameter is solved based on the end admittance compensation amount obtained through Cartesian space admittance control. The joint admittance compensation amount is capable of realizing the compliance control in the joint space because the joint admittance compensation amount is calculated based on the joint space admittance control operation. Since the second joint parameter is determined based on the first joint parameter, the first slack variable, and the joint admittance compensation amount, the second joint parameter is obtained by further combining the compliance control conditions in the joint space under the premise of ensuring the compliance control of the working task in the Cartesian space and considering the motion error of Cartesian space admittance control. Furthermore, by controlling the robot to move according to the target joint commanding position obtained based on the second joint parameter, it can realize the effective combination of the Cartesian space admittance control and joint space admittance control while avoiding the influence of joint complying on the pose of the end, hence it can not only avoid the damage to the operation object or the robot caused by the excessive contact force caused by the position error of the end, but also realize the requirements of compliant and dynamic obstacle avoidance in the joint space, so as to realize the compliant control of the robot safely and accurately. On the other hand, since the trajectory planning parameter and force data (including force data of the end and force data of the joints) of the joints of the limb of the robot can be obtained at the beginning, the final target joint commanding position is obtained based on the trajectory planning parameter and the force data, hence the planning and tracking of the motion trajectory of the robot can be realized, thereby realizing the cooperative compliance control of force and position.

Embodiment I

FIG. 1 is a flow chart of a robot control method according to an embodiment of the present disclosure. In this embodiment, a robot control method is provided. The robot control method is a computer-implemented method executable for (a processor of) a robot. In other embodiments, the method may be implemented through a robot control apparatus shown in FIG. 3 or a robot 5 shown in FIG. 4. As shown in FIG. 1, in this embodiment, the robot control method may include the following steps.

S101: obtaining a trajectory planning parameter of joint(s) of a limb of a robot, force data of an end of the limb, and force data of the joint(s).

In this embodiment, the trajectory planning parameter is a parameter for planning the motion trajectory of the joints of the limb (e.g., an arm) of the robot (e.g., a robotic arm), which may be for describing the reference position expected to be reached during the motion of the limb of the robot. The trajectory planning parameter may be input (through, for example, an input interface of the system of the robot) by the user of the robot, or be generated by a path planning algorithm executed by the robot.

The force data of the end is data representing the magnitude of the force exerted on the end of the limb of the robot, which may be collected by a force sensor installed at the end of the limb of the robot.

The force data of the joint is data representing the magnitude of the force exerted on the joints of the robot, which may be collected by a force sensor installed at each of the joints of the limb of the robot.

S102: obtaining an end admittance compensation amount of the robot in a Cartesian space by performing a Cartesian space admittance control operation on the force data of the end.

In this embodiment, the Cartesian space admittance control operation is an algorithm for performing admittance control in a Cartesian space. Admittance control refers to a compliant control method in which a controller of the robot is equivalent to an admittance system with the input being an external force and the output being the position or speed that the limb of the robot needs to reach. The Cartesian space is a Cartesian coordinate system space in which the robot interacts with the outside world when performing tasks, which may also be called a task space or an operation space.

For example, the relative position between the robot and the people/objects in the external world can be described through the Cartesian space. The coordinate system of the Cartesian space is a three-dimensional coordinate system, which may describe the three-dimensional coordinate position through three parameters namely x, y, and z (that describes the position on the x-axis, y-axis, and z-axis in the three-dimensional coordinate system), or further describe the three-dimensional coordinate position through x, y, z, $\varphi x$, $\varphi y$, and $\varphi z$, where $\varphi x$, $\varphi y$, and $\varphi z$ are for describing the included angles between the three-dimensional coordinate position and the x-axis, y-axis, and z-axis, respectively.

The collected force data of the end of the robot is input into an admittance controller of the Cartesian space to perform admittance control operation, and then the end admittance compensation amount of the robot in Cartesian space can be obtained. The end admittance compensation amount is the offset to the end of the limb of the robot in the Cartesian space that is caused by the force data of the end, where the force data of the end is calculated through admittance control operation, and the offset is the error between the instruction input data and the expected reference data. The end admittance compensation amount may be an end position compensation amount or an end velocity compensation amount. In which, the end position compensation amount is for describing the difference between an input end commanding position and an expected end reference position in the Cartesian space. The end velocity compensation amount is for describing the difference between the actual input end commanding velocity and the expected end reference velocity in the Cartesian space.

S103: determining a first joint parameter and a first slack variable corresponding to the end admittance compensation amount in a joint space of each of the joint(s) based on the end admittance compensation amount and the trajectory planning parameter, where the first slack variable represent a motion error of Cartesian space admittance control.

In this embodiment, for one limb of the robot with n degrees of freedom, the positions of all the links of it may be determined by one set of variables of n joint. Such a set of variables is usually referred to as an n*1 joint vector, and the space composed of all the joint vectors is referred to as the joint space. In which, n is a positive integer larger than 0, and "*" represents a multiplication sign. As an example, the limb of the robot may have 7 degrees of freedom, and the joint space has 7 joint vectors, where the joint position or joint angular velocity of each joint can be described according to these 7 joint vectors.

After the end admittance compensation amount is obtained, the end admittance compensation amount may be added to the reference position related information carried by the trajectory planning parameter to determine the actual expected end control quantity of the end of the limb of the robot in the Cartesian space after Cartesian space admittance control. Afterwards, according to the mapping relationship between the Cartesian space and the joint space, the corresponding joint parameter of the end control quantity converted to the joint space is determined, and the obtained joint parameter is referred to as the first joint parameter. In which, the joint parameter may be the joint position or the joint angular velocity, that is, the first joint parameter may be the first joint position or the first joint angular velocity.

When converting the end control quantity to the corresponding first joint parameter in the joint space, there is a certain deviation between the expected end control quantity and the end control quantity that can be actually achieved through the first joint parameter, and the deviation is the motion error of Cartesian space admittance control, which is referred to as the first slack variable.

S104: obtaining a joint admittance compensation amount of the robot in the joint space of each of the joint(s) by performing a joint space admittance control operation on the force data of the joint(s).

In this embodiment, the joint space admittance control operation may be an algorithm for performing admittance control in the joint space. The joint admittance compensation amount of the robot in the joint space may be obtained by inputting the collected force data of the joint(s) of the robot into an admittance controller of the joint space to perform the admittance control operation. The joint admittance compensation amount is an offset in the joint space to the joints of the limb of the robot that is caused by the force data of the joint(s) that is obtained through the admittance control operation. The joint admittance compensation amount may be a joint position compensation amount or a joint velocity compensation amount. In which, the joint position compensation amount is for describing the difference between an input joint commanding position and an expected joint reference position in the joint space, and the joint velocity compensation amount is for describing the difference between the actual input joint commanding velocity and the expected joint reference velocity in the joint space.

S105: determining a second joint parameter based on the first joint parameter, the first slack variable, the joint admittance compensation amount, and the trajectory planning parameter.

After the first joint parameter, the first slack variable, and the joint admittance compensation amount are determined, the first joint parameter, the joint admittance compensation amount, and the reference position information in the joint space that is contained in the trajectory planning parameter are added to determine the commanding control quantity actually required in the joint space as the to-be-determined second joint parameter. There are usually a plurality of to-be-determined second joint parameters obtained by solving. In this case, the to-be-determined second joint parameter that satisfies the first slack variable is further determined as the final second joint parameter among all the to-be-determined second joint parameters. In which, the second joint parameter satisfies the first slack variable, which means that the deviation between the actual end control quantity of mapping the second joint parameter to the Cartesian space and the expected end control quantity is equal to the first slack variable. In which, the second joint parameter may be a second joint position or a second joint angular velocity.

S106: determining a target joint commanding position based on the second joint parameter.

After the second joint parameter is determined, the joint commanding position that needs to be input into the robot is obtained to take as the target joint commanding position based on the second joint parameter. In one embodiment, the second joint parameter may be the second joint position, and the second joint position may be directly used as the target joint commanding position.

S107: controlling the robot to move according to the target joint commanding position.

After the target joint commanding position is determined, it is input into a joint position controller of the robot so as to realize the motion control of the robot, so that the robot can move to the expected trajectory planning position in a compliant manner.

In this embodiment, the first joint parameter is capable of realizing the compliance control of the robot in the Cartesian space because the first joint parameter is solved based on the end admittance compensation amount obtained through Cartesian space admittance control. The joint admittance compensation amount is capable of realizing the compliance control in the joint space because the joint admittance compensation amount is calculated based on the joint space admittance control operation. Since the second joint parameter is determined based on the first joint parameter, the first slack variable, and the joint admittance compensation amount, the second joint parameter is obtained by further combining the compliance control conditions in the joint space under the premise of ensuring the compliance control of the working task in the Cartesian space and considering the motion error of Cartesian space admittance control. Furthermore, by controlling the robot to move according to the target joint commanding position obtained based on the second joint parameter, it can realize the effective combination of the Cartesian space admittance control and joint space admittance control while avoiding the influence of joint complying on the pose of the end, hence it can not only avoid the damage to the operation object or the robot caused by the excessive contact force caused by the position error of the end, but also realize the requirements of compliant and dynamic obstacle avoidance in the joint space, so as to realize the compliant control of the robot safely and accurately. On the other hand, since the trajectory planning parameter and force data (including force data of the end and force data of the joints) of the joints of the limb of the robot can be obtained at the beginning, the final target joint commanding position is obtained based on the trajectory planning parameter and the force data, hence the planning and tracking of the motion trajectory of the robot can be realized, thereby realizing the cooperative compliance control of force and position.

In one embodiment, the above-mentioned step S102 may include:

determining the end admittance compensation amount in the Cartesian space based on the force data of the end and a preset Cartesian space admittance coefficient, where the Cartesian space admittance coefficient includes a first inertia matrix, a first damping matrix, and a first stiffness matrix.

In this embodiment, the Cartesian space admittance control operation may be performed according to a preset Cartesian space admittance coefficient which may includes a first inertia matrix, a first damping matrix, and a first stiffness matrix that refer to the inertia matrix, the damping matrix, and the stiffness matrix which are set in advance in the Cartesian space, respectively. The inertia matrix may be a matrix for describing the inertial characteristics of a desired impedance model, the damping matrix may be a matrix for describing the damping characteristics of the impedance model, and the stiffness matrix may be a matrix for describing the stiffness characteristics of the impedance model.

In one embodiment, the admittance control operation in the Cartesian space may be realized through the first preset control equation of:

$$M_1(\ddot{X}_c-\ddot{X}_r)+B_1(\dot{X}_c-\dot{X}_r)+K_1(X_c-X_r)=F;$$

where, $M_1$ represents the first inertia matrix, $B_1$ represents the first damping matrix, and $K_1$ represents the first stiffness matrix; $X_r$, $\dot{X}_r$, and $\ddot{X}_r$ represent the expected end reference position, end reference velocity, and end reference acceleration in the Cartesian space, respectively; $\ddot{X}_c$, $\dot{X}_c$, and $X_c$ represent the end commanding position, end commanding velocity, and end commanding acceleration in the Cartesian space, respectively, and F represents the force data of the end.

For example, the difference between the above-mentioned end commanding position and end reference position is referred to as the end position compensation amount $\Delta X$, where $\Delta X=(X_c-X_r)$; the difference between the end commanding velocity and the end reference velocity is referred to as the end velocity compensation amount $\Delta \dot{X}$, where $\Delta \dot{X}=(\dot{X}_c-\dot{X}_r)$; and the difference between the end commanding acceleration and the end reference acceleration is referred to as the end acceleration compensation amount $\Delta \ddot{X}$, where $\Delta \ddot{X}=(\ddot{X}_c-\ddot{X}_r)$. The end admittance compensation amount obtained by performing the Cartesian spatial admittance control operation based on the force data of the end may be the above-mentioned end position compensation amount $\Delta X$ or end velocity compensation amount $\Delta \dot{X}$.

For example, in the actual admittance control operation, the above-mentioned first preset control equation may be transformed into the second preset control equation as:

$$M_1\Delta\ddot{X}(t)+B_1\Delta\dot{X}(t-1)+K_1\Delta X(t-1)=F;$$

where, $\Delta\ddot{X}(t)$ is the end acceleration compensation amount to be solved in the current control cycle t; and $\Delta\dot{X}(t-1)$ and $\Delta X(t-1)$ are the known end velocity compensation amount and the known end position compensation amount of the previous control cycle t−1, respectively. $\Delta\dot{X}(t-1)$ and $\Delta X(t-1)$ are initially 0 (i.e., they will be 0 in the initial state that there is no previous control cycle and the current control cycle is the first control cycle). The end acceleration compensation amount $\Delta\ddot{X}(t)$ of the current control cycle t can be solved based on the above-mentioned preset Cartesian space admittance coefficient, the obtained force data F of the end, and the known $\Delta\dot{X}(t-1)$ and $\Delta X(t-1)$. The end velocity compensation amount $\Delta\dot{X}(t)$ of the current control cycle t may be solved by integrating the end acceleration compensation amount, and the end position compensation amount $\Delta X(t)$ of the current control cycle may be obtained by further integrating the end velocity compensation amount $\Delta\dot{X}(t)$ of the current control cycle.

Figure 2:
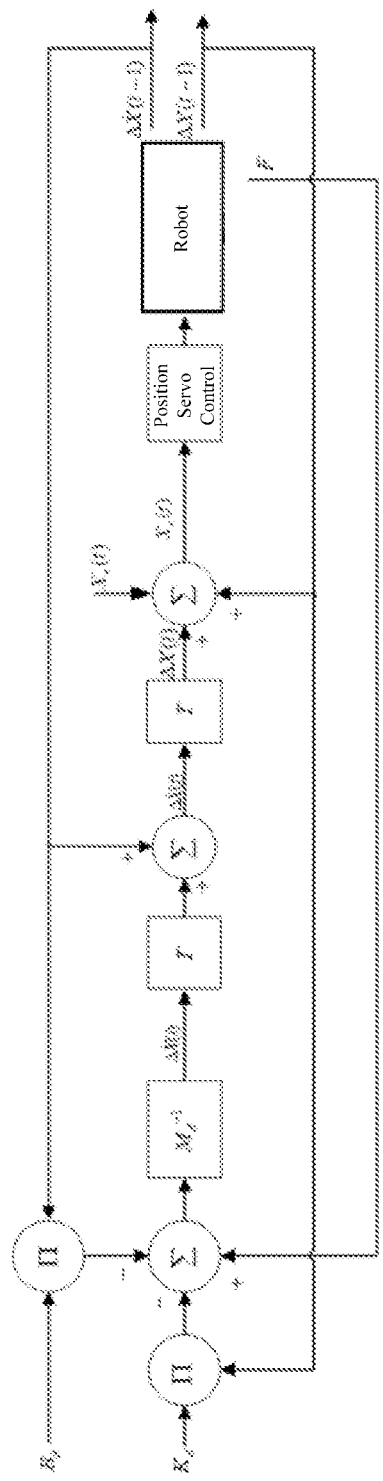
FIG. 2 is a schematic block diagram of an admittance control in Cartesian space according to an embodiment of the present disclosure.

FIG. 2 is a schematic block diagram of an admittance control in Cartesian space according to an embodiment of the present disclosure. As shown in FIG. 2, for example, the admittance control in the Cartesian space is performed according to the above-mentioned second preset control equation, where the meaning of each character is the same as that in the forgoing related description. In addition, "T" represents an integral operation, "Π" represents a multiplication operation, and "Σ" represents an addition operation.

In this embodiment, since the Cartesian space admittance control operation can be accurately performed according to the preset Cartesian admittance coefficient, the end admittance compensation amount in the Cartesian space can be accurately obtained, thereby accurately realizing the compliant control in the Cartesian space.

In one embodiment, the above-mentioned step S104 may include:

determining the joint admittance compensation amount in the joint space based on the force data of the one or more joints and a preset joint space admittance coefficient, wherein the joint space admittance coefficient includes a second inertia matrix, a second damping matrix, and a second stiffness matrix.

In this embodiment, the joint space admittance control operation may be performed according to the preset joint space admittance coefficient which includes a second inertia matrix, a second damping matrix, and a second stiffness matrix that refer to the inertia matrix, the damping matrix and the stiffness matrix which are set in advance in the joint space, respectively In one embodiment, the admittance control operation in the joint space may be implemented through a third preset control equation of:

$$M_2(\ddot{q}_c-\ddot{q}_r)+B_2(\dot{q}_c-\dot{q}_r)+K_2(q_c-q_r)=\tau;$$

where, $M_2$ represents the second inertia matrix, $B_2$ represents the second damping matrix, and $K_2$ represents the second stiffness matrix; $q_r$, $\dot{q}_r$, and $\ddot{q}_r$ represent the expected joint reference position, joint reference velocity, and joint reference acceleration in the joint space, respectively; $\ddot{q}_c$, $\dot{q}_c$, and $q_c$ represent the joint commanding position, the joint commanding velocity, and the joint instruction acceleration in the joint space, respectively; and $\tau$ represents the force data of the joint.

For example, the difference between the above-mentioned joint commanding position and joint reference position is referred to as the joint position compensation amount $\Delta q$, where $\Delta q=(q_c-q_r)$; the difference between the joint commanding velocity and the joint reference velocity is referred to as the joint velocity compensation amount $\Delta \dot{q}$, where $\Delta \dot{q}=(\dot{q}_c-\dot{q}_r)$; and the difference between the joint instruction acceleration and the joint reference acceleration is referred to as the joint acceleration compensation amount $\Delta \ddot{q}$, where $\Delta \ddot{q}=(\Delta \ddot{q}_c-\Delta \ddot{q}_r)$. The joint admittance compensation amount obtained by performing the joint space admittance control operation based on the force data of the joint may be the above-mentioned joint position compensation amount $\Delta q$ or joint velocity compensation amount $\Delta \dot{q}$.

For example, in the actual admittance control operation, the above-mentioned third preset control equation may be transformed into a third preset control equation of:

$$M_2\Delta\ddot{q}(t)+B_2\Delta\dot{q}(t-1)+K_2\Delta q(t-1)=\tau;$$

where, $\Delta\ddot{q}(t)$ is the joint acceleration compensation amount to be solved in the current control cycle t; $\Delta\dot{q}(t-1)$ and $\Delta q(t-1)$ are the known joint velocity compensation amount and joint position compensation amount of the previous control cycle (t−1), respectively; $\Delta\dot{q}(t-1)$ and $\Delta q(t-1)$ are initially 0 (i.e., they will be 0 in the initial state that there is no previous control cycle and the current control cycle is the first control cycle). The joint acceleration compensation amount $\Delta\ddot{q}(t)$ of the current control cycle t may be obtained by solving based on the above-mentioned preset joint space admittance coefficient, the obtained force data $\tau$ of the joints, and the known $\Delta\dot{q}(t-1)$ and $\Delta q(t-1)$. The joint velocity compensation amount of the current control cycle may be obtained by integrating the joint acceleration compensation amount $\Delta\ddot{q}(t)$; and the joint position compensation amount $\Delta q(t)$ of the current control cycle may be obtained by further integrating the joint velocity compensation amount $\Delta\dot{q}(t)$ of the current control cycle. The process of the operation of the joint space admittance control performed according to the above-mentioned third preset control equation is similar to that of the Cartesian space admittance control shown in FIG. 2, which will not be repeated herein.

In this embodiment, since the joint space admittance control operation can be accurately performed according to the preset joint admittance coefficient, the joint admittance compensation amount in the joint space can be accurately obtained, thereby realizing the compliance control in the joint space accurately.

In one embodiment, the first joint parameter may be the first joint angular velocity, and the second joint parameter may be the second joint angular velocity. Correspondingly, the above-mentioned step S106 may include:

obtaining the target joint commanding position by performing an integral operation on the second joint angular velocity.

In this embodiment, the end admittance compensation amount determined by the robot in the Cartesian space may be the end velocity compensation amount $\Delta \dot{X}$, and the first joint parameter determined based on the end velocity compensation amount and the trajectory planning parameter may be the first joint angular velocity $\dot{q}_1$. Correspondingly, the second joint parameter determined according to the first joint angular velocity, the joint admittance compensation amount, and the trajectory planning parameter may be the second joint angular velocity $\dot{q}_2$. Correspondingly, in step S106, the target joint commanding position $q_c(t)$ in the current control cycle may be obtained by integrating the second joint angular velocity $\dot{q}_2$. Specifically, $q_c(t)=q_c(t-1)+\int \dot{q}_2^{dt}$, where $q_c(t-1)$ is the joint commanding position of the previous control cycle.

In this embodiment, since the target joint commanding position of the current control cycle can be accurately obtained through integral operation when the obtained second joint parameter is the second joint angular velocity, the robot can achieve compliant movement accurately according to the target joint commanding position.

In one embodiment, the trajectory planning parameter may include any one of an end reference position, an end reference velocity, a joint reference position, and a joint reference velocity.

In this embodiment, the trajectory planning parameter may be a parameter obtained by performing a trajectory planning in the Cartesian space, and in this case, the trajectory planning parameter may be the end reference position $X_r$ or the end reference velocity $\dot{X}_r$ expected by the trajectory planning. Alternatively, the trajectory planning parameter may be a parameter obtained by performing trajectory planning on the joint space, and in this case, the trajectory planning parameter may be the joint reference position $q_r$ or the joint reference velocity $\dot{q}_r$ expected by the trajectory planning.

In this embodiment, the robot control method uses any one of the end reference position, the end reference velocity, the joint reference position, and the joint reference velocity as the trajectory planning parameter for input in a flexible manner, thereby improving the flexibility of the robot control method.

In one embodiment, the above-mentioned step S103 may include:

obtaining the first joint parameter and the first slack variable by solving a preset first constraint equation based on the end admittance compensation amount, the trajectory planning parameter, and a preset joint position range so that a two-norm of the first slack variable in the first constraint equation is minimized;

where, the first constraint equation is for constraining a relationship between a first control quantity in the Cartesian space and the corresponding first joint parameter in the joint space, the first control quantity is obtained based on the end admittance compensation amount and the trajectory planning parameter, and the first slack variable is for describing a deviation between a result of multiplying the first joint parameter by a preset Jacobian matrix and the first control quantity.

In this embodiment, the preset joint position range may be $q_{min}<q<q_{max}$, where $q_{max}$ and $q_{min}$ are real numbers, which are used to represent the upper and lower limit, respectively, of the joint angular position of the robot.

In one embodiment, when the end admittance compensation amount $\Delta \dot{X}$ is the end velocity compensation amount $\Delta \dot{X}$, and the first joint parameter is the first joint angular velocity $\dot{q}_1$, the first constraint equation will be as an equation of:

$$J \cdot \dot{q}_1 = w_1 = \Delta \dot{X} + \dot{X}_1 + \dot{X}_{q\_from\_qr} + l(X_{respect} - X_{command});$$

where, J represents a preset Jacobian matrix, which is for describing the differential motion mapping relationship between the joint space and the Cartesian space, and can be calculated in advance according to the current joint positional state of the robot;

$\dot{q}_1$ represents the first joint angular velocity; $w_1$ represents the first slack variable, $\Delta \dot{X}$ represents the end velocity compensation amount calculated through the Cartesian space admittance control, and $\dot{X}_r$ represents the end reference velocity. When the trajectory planning parameter is the end reference velocity; and $\dot{X}_r$ may be obtained directly from the input interface (of, for example, the system of the robot) of the trajectory planning parameter. When the trajectory planning parameter is the end reference position, $\dot{X}_r$ can be obtained by differentiating in the current control cycle based on the end reference position; and when the trajectory planning parameter is the joint reference velocity or joint reference position, $\dot{X}_r=0$.

$\dot{X}_{r\_from\_qr}$ represents the end velocity in the Cartesian space that corresponds to the joint reference velocity $\dot{q}_r$ planned in the joint space, $\dot{X}_{r\_from\_qr}=J \cdot (\dot{q}_r)=J \cdot (q_r-q_{r\_less})/t$, where $q_r$ represents the joint reference position in the joint space that is planned in the current control cycle t, and $q_{r\_last}$ represents the joint reference position in the joint space that is planned in the previous control cycle t-1. If the current trajectory planning parameter is the end reference velocity or the end reference position in the Cartesian space, $\dot{X}_{r\_from\_qr}=0$.

$X_{respect}$ represents a target end reference position determined by combining the Cartesian space admittance control and the joint space admittance control. For example, $X_{respect}=X_{init}+\int_0^t (\Delta \dot{X} + \dot{X}_r + \dot{X}_{r\_from\_qr})dt$, where $X_{init}$ represents the initial pose of the end of the robot in this control cycle; and t represents the current control cycle.

$X_{command}$ represents the end commanding position finally determined by combining the Cartesian space admittance control and the joint space admittance control. For example, $X_{command}=f(q_c)$, where f( ) represents the forward kinematics function of the robot, and $q_c$ represents the target joint commanding position.

k is a preset scale coefficient.

The right part of the above-mentioned equation constitutes the first control quantity in the Cartesian space.

In this embodiment, the first joint velocity $\dot{q}_1$ that satisfies the first constraint equation: $J \cdot \dot{q}_1 = w_i = \Delta \dot{X} + \dot{X}_r + \dot{X}_{r\_from\_qr} + k(X_{respect} - X_{command})$ and minimizes a two-norm $\|w_1\|$ of the first slack variable $w_1$ is solved within the preset joint position range $q_{min}<q<q_{max}$ to take as the first joint parameter. The constraint condition (referred to as the first constraint condition) for solving the above-mentioned first joint parameter and first slack variable may be summarized as:

$$\begin{cases} \min_{q_1-w_1} \|w_1\| \\ J \cdot \dot{q}_1 - w_1 = \Delta \dot{X} + \dot{X}_r + \dot{X}_{r\_from\_qr} + k(X_{respect} - X_{command}) \\ q_{min} < q < q_{max} \end{cases}.$$

For example, the values solved through the above-mentioned first constraint condition include the first slack variable $w_1$ and the first joint velocity $\dot{q}_1$ that minimize $\|w_1\|$, where there may be a plurality of first joint velocities $\dot{q}_1$ that satisfy the first constraint condition, that is, the solved first joint parameter of is actually a set of the first joint velocities.

In another embodiment, when the end admittance compensation amount is the end position compensation amount $\Delta X$, and the first joint parameter is the first joint position $q_1$, the first constraint equation may be as:

$$J \cdot q_1 - w_1 = \Delta X + X_r + X_{r\_from\_qr} + k(X_{respect} - X_{command});$$

where, $\Delta X$ represents the end position compensation amount, $q_1$ represents the first joint position, and $X_r$ represents the end reference position; $\dot{X}_{r\_from\_qr}$ represents the end position in the Cartesian space that corresponds to the joint reference position $q_r$ planned in the joint space, where $X_{r\_from\_qr} = J \cdot q_r$; and J, $w_1$, k, $X_{respect}$, and $X_{command}$ has the same definition as the forgoing embodiment.

In this embodiment, since the first joint parameter and the first slack variable may be obtained accurately by solving based on the end admittance compensation amount, the trajectory planning parameter, the preset joint position range, and the first constraint equation, the influence of the force data of the end on the joint space after the Cartesian space admittance control is performed can be accurately determined, so as to determine the subsequent target joint commanding position accurately based on the first joint parameter, thereby realizing the compliance control of the robot safely and effectively.

In one embodiment, the above-mentioned step S105 may include:

obtaining the second joint parameter by solving a preset second constraint equation on a premise of satisfying the first constraint equation based on the first joint parameter, the first slack variable, the joint admittance compensation amount, the trajectory planning parameter, and the joint position range so that a two-norm of the second slack variable in the second constraint equation is minimized;

where, the second constraint equation is for constraining a relationship between a second control quantity in the joint space and the corresponding second joint parameter in the joint space, the second control quantity is obtained based on the first joint parameter, the joint admittance compensation amount, and the trajectory planning parameter, and the second slack variable is for describing a deviation between the second joint parameter and the second control quantity.

In one embodiment, when the joint admittance compensation amount is the joint position compensation amount and the second joint parameter is the second joint position, the second constraint equation may be as:

$$q_2 - w_2 = (q_r + \Delta q + \int \dot{q}_1);$$

where, $q_r$ represents the joint reference position planned in the joint space, $\Delta q$ represents the joint position compensation amount, $q_2$ represents the second joint parameter, $(q_r + \Delta q + \int \dot{q}_1)$ represents the second control quantity, and $w_2$ represents the second slack variable.

In this embodiment, on the premise that the first constraint condition (i.e., the first joint parameter and the first slack variable are obtained according to the first constraint equation) is satisfied, and the second joint position $q_2$ that satisfies the second constraint equation $q_2 - w_2 = (q_r + \Delta q + \int \dot{q}_1)$ and minimizes a two-norm $\|w_2\|$ of the second slack variable $w_2$ is taken as the second joint parameter is solved. The constraint condition (referred to as the second constraint condition) of solving the above-mentioned second joint parameter may be summarized as:

$$\begin{cases} \min_{q_2, w_2} \|w_2\| \\ q_2 - w_2 = \left(q_r + \Delta q + \int \dot{q}_1\right) \\ J \cdot \dot{q}_1 = w_1 + \Delta \dot{X} + \dot{X}_r + \dot{X}_{r\_from\_qr} + k(X_{respect} - X_{command}) \\ q_{min} < q < q_{max} \end{cases}.$$

For example, the value obtained through the above-mentioned second constraint condition may include the second slack variable $w_2$ and the second joint position $q_2$ that minimize $\|w_2\|$.

In another embodiment, when the joint admittance compensation is the joint velocity compensation amount and the second joint parameter is the second joint angular velocity, the second constraint equation may be as:

$$\dot{q}_2 - w_2 = (\dot{q}_r + \Delta \dot{q} + \dot{q}_1);$$

where, $\dot{q}_r$ represents the joint reference position planned in the joint space, $\Delta \dot{q}$ represents the joint position compensation amount, $\dot{q}_2$ represents the second joint parameter, $(\dot{q}_r + \Delta \dot{q} + \dot{q}_1)$ represents the second control quantity, and $w_2$ represents the second slack variable.

In this embodiment, the second joint parameter can be solved accurately based on the first joint parameter, the first slack variable, the joint admittance compensation amount, the trajectory planning parameter, the preset joint position range, and the second constraint equation, so that the target joint commanding position can be accurately determined according to the second joint parameter subsequently, thereby realizing the compliance control of the robot safely and effectively.

As shown in FIG. 2, for example, a multi-space cooperative compliance control is realized by the orderly combining the Cartesian space admittance control operation and the joint space admittance control operation. After the Cartesian space admittance control operation is performed to obtain the end velocity compensation amount $\Delta \dot{X}$, by combining with the end reference velocity $\dot{X}_r$ in the trajectory planning parameter, in a first solver, the first joint parameter $q_1$ and the first slack variable $w_1$ that satisfies the first constraint condition $$\begin{cases} \min_{q_1, w_1} \|w_1\| \\ J \cdot \dot{q}_1 - w_1 = \Delta \dot{X} + \dot{X}_r + \dot{X}_{r\_from\_qr} + k(X_{respect} - X_{command}) \\ q_{min} < q < q_{max} \end{cases}$$

is solved. Furthermore, after the joint control admittance control operation is performed to obtain the joint position compensation amount $\Delta q$, by combining with the joint reference position $q_r$ in the trajectory planning parameter, in a second solver, the second joint parameter $q_2$ and the second slack variable $w_2$ that satisfy the second constraint condition $$\begin{cases} \min_{q_2, w_2} \|w_2\| \\ q_2 - w_2 = \left(q_r + \Delta q + \int \dot{q}_1\right) \\ J \cdot \dot{q}_1 = w_1 + \Delta \dot{X} + \dot{X}_r + \dot{X}_{r\_from\_qr} + k(X_{respect} - X_{command}) \\ q_{min} < q < q_{max} \end{cases}$$

is solved. Then, the target joint commanding position q, is obtained according to the second joint parameter $q_2$. By inputting the target joint commanding position $q_c$ into the joint position controller of the robot, the robot can move compliantly according to the target joint commanding position.

It should be understood that, the sequence of the serial number of the steps in the above-mentioned embodiments does not mean the execution order while the execution order of each process should be determined by its function and internal logic, which should not be taken as any limitation to the implementation process of the embodiments.

Embodiment II

Figure 3:
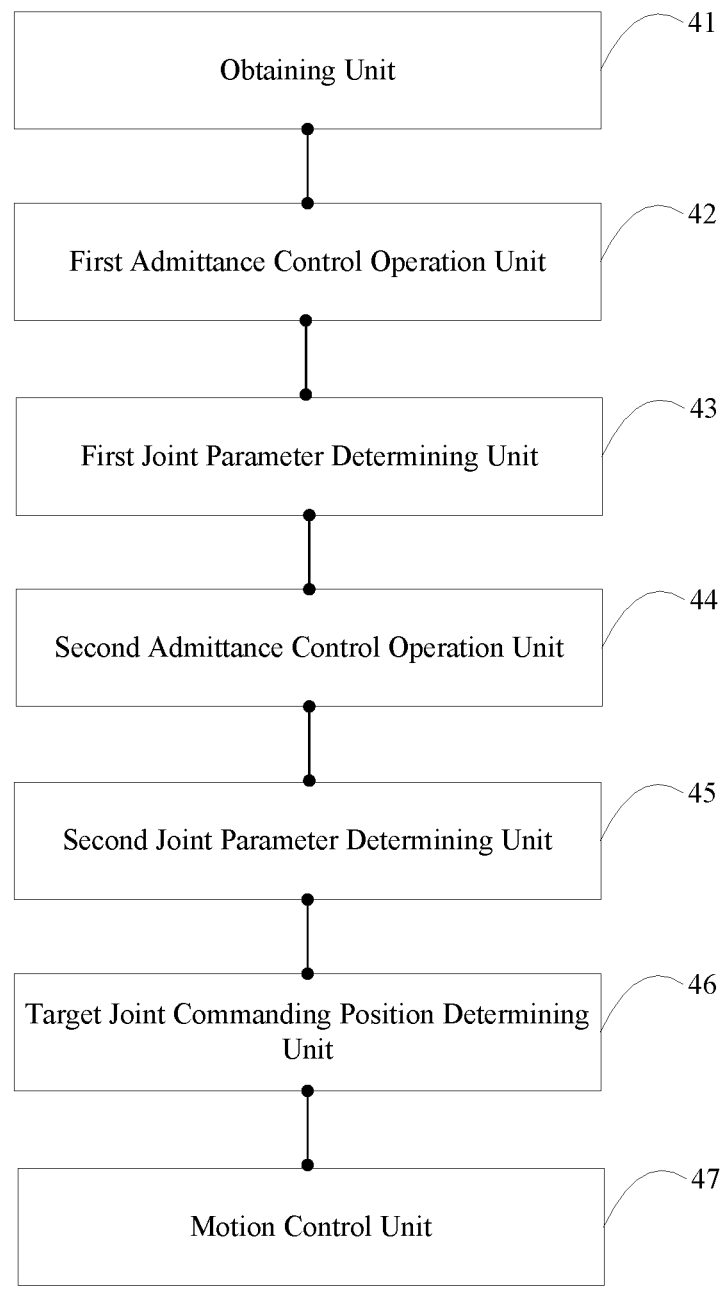
FIG. 3 is a schematic block diagram of a robot control apparatus according to an embodiment of the present disclosure.

FIG. 3 is a schematic block diagram of a robot control apparatus according to an embodiment of the present disclosure. For the convenience of description, only parts related to this embodiment are shown. As shown in FIG. 3, in this embodiment, the robot control apparatus may include an obtaining unit 41, a first admittance control operation unit 42, a first joint parameter determining unit 43, a second admittance control operation unit 44, a second joint parameter determining unit 45, a target joint commanding position determining unit 46, and a motion control unit 47. In which:

the obtaining unit 41 is configured to obtain a trajectory planning parameter of one or more joints of the robot, force data of an end of the robot, and force data of the one or more joints;

the first admittance control operation unit 42 is configured to obtain an end admittance compensation amount of the robot in a Cartesian space by performing a Cartesian space admittance control operation on the force data of the end;

the first joint parameter determining unit 43 is configured to determine a first joint parameter and a first slack variable corresponding to the end admittance compensation amount in a joint space of each of the one or more joints based on the end admittance compensation amount and the trajectory planning parameter, wherein the first slack variable represent a motion error of Cartesian space admittance control;

the second admittance control operation unit 44 is configured to obtain a joint admittance compensation amount of the robot in the joint space of each of the one or more joints by performing a joint space admittance control operation on the force data of the one or more joints;

the second joint parameter determining unit 45 is configured to determine a second joint parameter based on the first joint parameter, the first slack variable, the joint admittance compensation amount, and the trajectory planning parameter;

the target joint commanding position determining unit 46 is configured to determine a target joint commanding position based on the second joint parameter; and the motion control unit 47 is configured to control the robot to move according to the target joint commanding position.

In one embodiment, the first admittance control arithmetic unit 42 may be configured to determine the end admittance compensation amount in the Cartesian space based on the force data of the end and a preset Cartesian space admittance coefficient, wherein the Cartesian space admittance coefficient includes a first inertia matrix, a first damping matrix, and a first stiffness matrix.

In one embodiment, the second admittance control arithmetic unit 44 may be configured to determine the joint admittance compensation amount in the joint space based on the force data of the one or more joints and a preset joint space admittance coefficient, wherein the joint space admittance coefficient includes a second inertia matrix, a second damping matrix, and a second stiffness matrix.

In one embodiment, the first joint parameter value may be the first joint angular velocity, and the second joint parameter value may be the second joint angular velocity. Correspondingly, the target joint command position determination unit 46 may be configured to obtain the target joint commanding position by performing an integral operation on the second joint angular velocity.

In one embodiment, the first joint parameter value determination unit 43 may be configured to obtaining the first joint parameter and the first slack variable by solving a preset first constraint equation based on the end admittance compensation amount, the trajectory planning parameter, and a preset joint position range so that a two-norm of the first slack variable in the first constraint equation is minimized; and where, the first constraint equation is for constraining a relationship between a first control quantity in the Cartesian space and the corresponding first joint parameter in the joint space, the first control quantity is obtained based on the end admittance compensation amount and the trajectory planning parameter, and the first slack variable is for describing a deviation between a result of multiplying the first joint parameter by a preset Jacobian matrix and the first control quantity.

In one embodiment, the second joint parameter value determining unit 45 may be configured to obtaining the second joint parameter by solving a preset second constraint equation on a premise of satisfying the first constraint equation based on the first joint parameter, the first slack variable, the joint admittance compensation amount, the trajectory planning parameter, and the joint position range so that a two-norm of the second slack variable in the second constraint equation is minimized; and where, the second constraint equation is for constraining a relationship between a second control quantity in the joint space and the corresponding second joint parameter in the joint space, the second control quantity is obtained based on the first joint parameter, the joint admittance compensation amount, and the trajectory planning parameter, and the second slack variable is for describing a deviation between the second joint parameter and the second control quantity.

In one embodiment, the trajectory planning parameter may include any one of an end reference position, an end reference velocity, a joint reference position, and a joint reference velocity.

It should be noted that, the information exchange, execution process and other contents between the above-mentioned device/units are based on the same concept as the method embodiments of the present disclosure. For the specific functions and technical effects, please refer to the method embodiments, which will not be repeated herein.

Embodiment III

Figure 4:
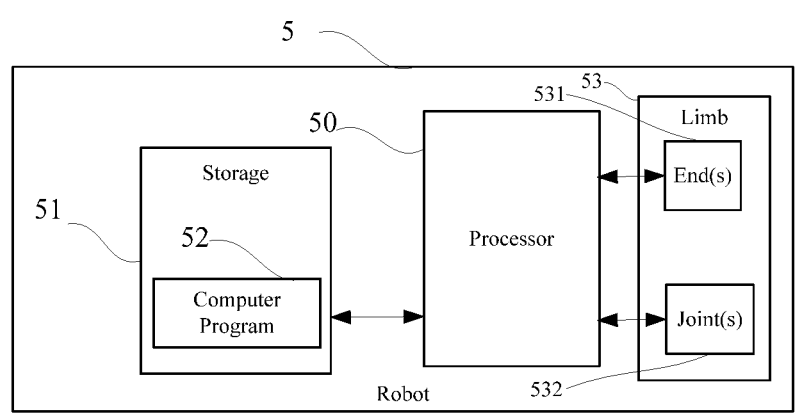
FIG. 4 is a schematic block diagram of a robot according to an embodiment of the present disclosure.

FIG. 4 is a schematic block diagram of a robot according to an embodiment of the present disclosure. As shown in FIG. 4, in this embodiment, a robot 5 (e.g., a robotic arm) includes a processor 50, a storage 51, a computer program 52 stored in the storage 51 and executable on the processor 50, for example, a robot control program, and a limb 53 having an end 531 and a plurality of joints 532. When executing (instructions in) the computer program 52, the processor 50 implements the steps in the above-mentioned embodiments of the robot control method, for example, steps S101-S107 shown in FIG. 1. Alternatively, when the processor 50 executes the (instructions in) computer program 52, the functions of each module/unit in the above-mentioned device embodiments, for example, the functions of obtaining unit 41-motion control unit 47 shown in FIG. 3 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the robot 5.

The robot 5 may include, but is not limited to, the processor 50 and the storage 51. It can be understood by those skilled in the art that FIG. 4 is merely an example of the robot 5 and does not constitute a limitation on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program 52 and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of this embodiment may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of this embodiment, and should be included within the scope of the present disclosure.

What is claimed is:

1. A computer-implemented control method for a robot, comprising:
   obtaining a trajectory planning parameter of one or more joints of the robot, force data of an end of the robot, and force data of the one or more joints;
   obtaining an end admittance compensation amount of the robot in a Cartesian space by performing a Cartesian space admittance control operation on the force data of the end;
   determining a first joint parameter and a first slack variable corresponding to the end admittance compensation amount in a joint space of each of the one or more joints based on the end admittance compensation amount and the trajectory planning parameter, wherein the first slack variable represent a motion error of Cartesian space admittance control;
   obtaining a joint admittance compensation amount of the robot in the joint space of each of the one or more joints by performing a joint space admittance control operation on the force data of the one or more joints;
   determining a second joint parameter based on the first joint parameter, the first slack variable, the joint admittance compensation amount, and the trajectory planning parameter;
   determining a target joint commanding position based on the second joint parameter; and
   controlling the robot to move according to the target joint commanding position.

2. The method of claim 1, wherein the obtaining the end admittance compensation amount of the robot in the Cartesian space of the one or more joints by performing the Cartesian space admittance control operation on the force data of the end comprises:
   determining the end admittance compensation amount in the Cartesian space based on the force data of the end and a preset Cartesian space admittance coefficient, wherein the Cartesian space admittance coefficient includes a first inertia matrix, a first damping matrix, and a first stiffness matrix.

3. The method of claim 1, wherein the obtaining the joint admittance compensation amount of the robot in the joint space of each of the one or more joints by performing the joint space admittance control operation on the force data of the one or more joints comprises:
   determining the joint admittance compensation amount in the joint space based on the force data of the one or more joints and a preset joint space admittance coefficient, wherein the joint space admittance coefficient includes a second inertia matrix, a second damping matrix, and a second stiffness matrix.

4. The method of claim 1, wherein the second joint parameter is a second joint angular velocity, and the determining the target joint commanding position based on the second joint parameter comprises:
   obtaining the target joint commanding position by performing an integral operation on the second joint angular velocity.

5. The method of claim 1, wherein the determining the first joint parameter and the first slack variable corresponding to the end admittance compensation amount in the joint space of each of the one or more joints based on the end admittance compensation amount and the trajectory planning parameter comprises:
   obtaining the first joint parameter and the first slack variable by solving a preset first constraint equation based on the end admittance compensation amount, the trajectory planning parameter, and a preset joint position range so that a two-norm of the first slack variable in the first constraint equation is minimized;
   wherein, the first constraint equation is for constraining a relationship between a first control quantity in the Cartesian space and the corresponding first joint parameter in the joint space, the first control quantity is obtained based on the end admittance compensation amount and the trajectory planning parameter, and the first slack variable is for describing a deviation between a result of multiplying the first joint parameter by a preset Jacobian matrix and the first control quantity.

6. The method of claim 5, wherein the determining the second joint parameter based on the first joint parameter, the first slack variable, the joint admittance compensation amount, and the trajectory planning parameter comprises:
   obtaining the second joint parameter by solving a preset second constraint equation on a premise of satisfying the first constraint equation based on the first joint parameter, the first slack variable, the joint admittance compensation amount, the trajectory planning parameter, and the joint position range so that a two-norm of the second slack variable in the second constraint equation is minimized;
   wherein, the second constraint equation is for constraining a relationship between a second control quantity in the joint space and the corresponding second joint parameter in the joint space, the second control quantity is obtained based on the first joint parameter, the joint admittance compensation amount, and the trajectory planning parameter, and the second slack variable is for describing a deviation between the second joint parameter and the second control quantity.

7. The method of claim 1, wherein the trajectory planning parameter includes any one of an end reference position, an end reference velocity, a joint reference position, and a joint reference velocity.

8. A robot, comprising:
   an end;
   one or more joints;
   a processor;
   a memory coupled to the processor; and
   one or more computer programs stored in the memory and executable on the processor;
   wherein, the one or more computer programs comprise:
   instructions for obtaining a trajectory planning parameter of the one or more joints of the robot, force data of the end of the robot, and force data of the one or more joints;
   instructions for obtaining an end admittance compensation amount of the robot in a Cartesian space by performing a Cartesian space admittance control operation on the force data of the end;
   instructions for determining a first joint parameter and a first slack variable corresponding to the end admittance compensation amount in a joint space of each of the one or more joints based on the end admittance compensation amount and the trajectory planning parameter, wherein the first slack variable represent a motion error of Cartesian space admittance control;

instructions for obtaining a joint admittance compensation amount of the robot in the joint space of each of the one or more joints by performing a joint space admittance control operation on the force data of the one or more joints;

instructions for determining a second joint parameter based on the first joint parameter, the first slack variable, the joint admittance compensation amount, and the trajectory planning parameter;

instructions for determining a target joint commanding position based on the second joint parameter; and instructions for controlling the robot to move according to the target joint commanding position.

9. The robot of claim 8, wherein the instructions for obtaining the end admittance compensation amount of the robot in the Cartesian space of the one or more joints by performing the Cartesian space admittance control operation on the force data of the end comprise:

instructions for determining the end admittance compensation amount in the Cartesian space based on the force data of the end and a preset Cartesian space admittance coefficient, wherein the Cartesian space admittance coefficient includes a first inertia matrix, a first damping matrix, and a first stiffness matrix.

10. The robot of claim 8, wherein the instructions for obtaining the joint admittance compensation amount of the robot in the joint space of each of the one or more joints by performing the joint space admittance control operation on the force data of the one or more joints comprise:

instructions for determining the joint admittance compensation amount in the joint space based on the force data of the one or more joints and a preset joint space admittance coefficient, wherein the joint space admittance coefficient includes a second inertia matrix, a second damping matrix, and a second stiffness matrix.

11. The robot of claim 8, wherein the second joint parameter is a second joint angular velocity, and the instructions for determining the target joint commanding position based on the second joint parameter comprise:

instructions for obtaining the target joint commanding position by performing an integral operation on the second joint angular velocity.

12. The robot of claim 8, wherein the instructions for determining the first joint parameter and the first slack variable corresponding to the end admittance compensation amount in the joint space of each of the one or more joints based on the end admittance compensation amount and the trajectory planning parameter comprise:

instructions for obtaining the first joint parameter and the first slack variable by solving a preset first constraint equation based on the end admittance compensation amount, the trajectory planning parameter, and a preset joint position range so that a two-norm of the first slack variable in the first constraint equation is minimized;

wherein, the first constraint equation is for constraining a relationship between a first control quantity in the Cartesian space and the corresponding first joint parameter in the joint space, the first control quantity is obtained based on the end admittance compensation amount and the trajectory planning parameter, and the first slack variable is for describing a deviation between a result of multiplying the first joint parameter by a preset Jacobian matrix and the first control quantity.

13. The robot of claim 12, wherein the instructions for determining the second joint parameter based on the first joint parameter, the first slack variable, the joint admittance compensation amount, and the trajectory planning parameter comprise:

instructions for obtaining the second joint parameter by solving a preset second constraint equation on a premise of satisfying the first constraint equation based on the first joint parameter, the first slack variable, the joint admittance compensation amount, the trajectory planning parameter, and the joint position range so that a two-norm of the second slack variable in the second constraint equation is minimized;

wherein, the second constraint equation is for constraining a relationship between a second control quantity in the joint space and the corresponding second joint parameter in the joint space, the second control quantity is obtained based on the first joint parameter, the joint admittance compensation amount, and the trajectory planning parameter, and the second slack variable is for describing a deviation between the second joint parameter and the second control quantity.

14. The robot of claim 8, wherein the trajectory planning parameter includes any one of an end reference position, an end reference velocity, a joint reference position, and a joint reference velocity.

15. A non-transitory computer-readable storage medium for storing one or more computer programs, wherein the one or more computer programs comprise:

instructions for instructions for obtaining a trajectory planning parameter of one or more joints of the robot, force data of an end of the robot, and force data of the one or more joints;

instructions for obtaining an end admittance compensation amount of the robot in a Cartesian space by performing a Cartesian space admittance control operation on the force data of the end;

instructions for determining a first joint parameter and a first slack variable corresponding to the end admittance compensation amount in a joint space of each of the one or more joints based on the end admittance compensation amount and the trajectory planning parameter, wherein the first slack variable represent a motion error of Cartesian space admittance control;

instructions for obtaining a joint admittance compensation amount of the robot in the joint space of each of the one or more joints by performing a joint space admittance control operation on the force data of the one or more joints;

instructions for determining a second joint parameter based on the first joint parameter, the first slack variable, the joint admittance compensation amount, and the trajectory planning parameter;

instructions for determining a target joint commanding position based on the second joint parameter; and instructions for controlling the robot to move according to the target joint commanding position.

16. The storage medium of claim 15, wherein the instructions for obtaining the end admittance compensation amount of the robot in the Cartesian space of the one or more joints by performing the Cartesian space admittance control operation on the force data of the end comprise:

instructions for determining the end admittance compensation amount in the Cartesian space based on the force data of the end and a preset Cartesian space admittance coefficient, wherein the Cartesian space admittance coefficient includes a first inertia matrix, a first damping matrix, and a first stiffness matrix.

17. The storage medium of claim 15, wherein the instructions for obtaining the joint admittance compensation amount of the robot in the joint space of each of the one or more joints by performing the joint space admittance control operation on the force data of the one or more joints comprise:
  instructions for determining the joint admittance compensation amount in the joint space based on the force data of the one or more joints and a preset joint space admittance coefficient, wherein the joint space admittance coefficient includes a second inertia matrix, a second damping matrix, and a second stiffness matrix.

18. The storage medium of claim 15, wherein the second joint parameter is a second joint angular velocity, and the instructions for determining the target joint commanding position based on the second joint parameter comprise:
  instructions for obtaining the target joint commanding position by performing an integral operation on the second joint angular velocity.

19. The storage medium of claim 15, wherein the instructions for determining the first joint parameter and the first slack variable corresponding to the end admittance compensation amount in the joint space of each of the one or more joints based on the end admittance compensation amount and the trajectory planning parameter comprise:
  instructions for obtaining the first joint parameter and the first slack variable by solving a preset first constraint equation based on the end admittance compensation amount, the trajectory planning parameter, and a preset joint position range so that a two-norm of the first slack variable in the first constraint equation is minimized;
  wherein, the first constraint equation is for constraining a relationship between a first control quantity in the Cartesian space and the corresponding first joint parameter in the joint space, the first control quantity is obtained based on the end admittance compensation amount and the trajectory planning parameter, and the first slack variable is for describing a deviation between a result of multiplying the first joint parameter by a preset Jacobian matrix and the first control quantity.

20. The storage medium of claim 19, wherein the instructions for determining the second joint parameter based on the first joint parameter, the first slack variable, the joint admittance compensation amount, and the trajectory planning parameter comprise:
  instructions for obtaining the second joint parameter by solving a preset second constraint equation on a premise of satisfying the first constraint equation based on the first joint parameter, the first slack variable, the joint admittance compensation amount, the trajectory planning parameter, and the joint position range so that a two-norm of the second slack variable in the second constraint equation is minimized;
  wherein, the second constraint equation is for constraining a relationship between a second control quantity in the joint space and the corresponding second joint parameter in the joint space, the second control quantity is obtained based on the first joint parameter, the joint admittance compensation amount, and the trajectory planning parameter, and the second slack variable is for describing a deviation between the second joint parameter and the second control quantity.

* * * * *